US009455557B2

(12) United States Patent
Blanchard et al.

(10) Patent No.: US 9,455,557 B2
(45) Date of Patent: Sep. 27, 2016

(54) ELECTRICAL CABLE PROTECTOR

(71) Applicant: AIRBUS OPERATIONS LIMITED, Bristol (GB)

(72) Inventors: Jack Blanchard, Bristol (GB); Anthony Bryant, Wotton-Under-Edge (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 132 days.

(21) Appl. No.: 13/755,364

(22) Filed: Jan. 31, 2013

(65) Prior Publication Data

US 2013/0192892 A1   Aug. 1, 2013

(30) Foreign Application Priority Data

Jan. 31, 2012   (GB) .................... 1201626.7

(51) Int. Cl.
*H02G 3/04* (2006.01)
*H02G 3/06* (2006.01)

(52) U.S. Cl.
CPC .......... *H02G 3/0437* (2013.01); *H02G 3/0608* (2013.01)

(58) Field of Classification Search
CPC .................................................. H02G 3/0437
USPC ..................................................... 174/68.1
See application file for complete search history.

(56) References Cited

U.S. PATENT DOCUMENTS

| 1,786,425 A | 12/1930 | Christie |
| 5,707,715 A | 1/1998 | DeRochemont et al. |
| 6,037,068 A | 3/2000 | De Rochemont et al. |
| 6,147,015 A | 11/2000 | Bureau |
| 6,521,835 B1 | 2/2003 | Walsh |
| 2001/0017214 A1 | 8/2001 | Saeki et al. |
| 2002/0036095 A1 | 3/2002 | Ewer et al. |
| 2005/0121211 A1* | 6/2005 | Diggle, III ............. H02G 1/085 174/19 |
| 2008/0156529 A1* | 7/2008 | Charon ................ H02G 3/0418 174/99 R |
| 2009/0191739 A1* | 7/2009 | Jur ....................... H01R 25/162 439/213 |
| 2010/0258686 A1* | 10/2010 | Sutton .................. H02G 3/0406 248/73 |
| 2011/0079429 A1 | 4/2011 | Ayme et al. |
| 2011/0253696 A1 | 10/2011 | Hanagan et al. |
| 2012/0205134 A1 | 8/2012 | Brasier et al. |
| 2013/0075153 A1 | 3/2013 | Viviant et al. |

FOREIGN PATENT DOCUMENTS

| AT | 329133 B | 4/1976 |
| DE | 19916263 A1 | 8/2000 |
| EP | 1414125 A1 | 4/2004 |
| GB | 2407439 A | 4/2005 |

(Continued)

OTHER PUBLICATIONS

Search Report corresponding to GB 1201626.7 dated May 22, 2012.

(Continued)

*Primary Examiner* — Timothy Thompson
*Assistant Examiner* — Paul McGee, III
(74) *Attorney, Agent, or Firm* — Hauptman Ham, LLP (57) ABSTRACT

A cable protector for connection to an aircraft electrical cable raceway, comprising a flexible conductive body defining a conduit through which an electrical cable can pass and an electrically conductive connection arrangement configured to enable connection of the body of the protector to a raceway in an electrically conductive manner.

15 Claims, 6 Drawing Sheets

(56) References Cited

FOREIGN PATENT DOCUMENTS

| WO | 9322814 | A1 | 11/1993 |
|---|---|---|---|
| WO | 9632161 | A1 | 10/1996 |

OTHER PUBLICATIONS

Sugie Seito Co., et al., "Cera Duct", Oct. 1, 2010, [http://www.sugie.co.jp/top_img/sugie_catalogue_us.pdf], pp. 1-14.

G. Sh. Mizheritskii, "Cable conduit System", The Great Soviet Encyclopedia, Jan. 1, 2010, [http:/encyclopedia2.thefreedictionary.com/Cable+Conduit+System].

European Application No. 13153003, Search Report dated Dec. 18, 2014.

Great Britain Application No. 1201647.3, Search Report dated May 29, 2012.

EP Application No. 13153364.8, Search Report dated Nov. 26, 2014.

\* cited by examiner

ELECTRICAL CABLE PROTECTOR

RELATED APPLICATIONS

The present application is based on, and claims priority from, British Application Number 1201626.7, filed Jan. 31, 2012, the disclosure of which is hereby incorporated by reference herein in its entirety.

The present invention relates to an electrical cable protector for connection to an aircraft in an electrical cable raceway.

Aircraft electrical cable raceways are typically made of aluminium and usually comprise several parallel elongate rigid channels in which the cables are retained and fastened. The raceway serves the purpose of guiding and securing the cables, protecting the cables from mechanical damage and shielding the cables from electro-magnetic hazards (EMH). Although sections of the raceway are rigid, it is necessary to include spaces between raceway sections due to breakout locations for part of the electric cabling carried in the raceway and to accommodate movement between raceway sections, for example due to flexing of the aircraft wing.

The spaces between raceway sections are designed to be minimised but in those small gaps, the wiring is unprotected by the raceway, especially in relation to EMH.

It is an object of the invention to provide an improved electrical cable protector for connection to an aircraft electrical cable raceway.

According to the invention there is provided a cable protector for connection to an aircraft electrical cable raceway, the protector comprising a flexible, electrically conductive body defining a conduit through which an electrical cable can pass and an electrically conductive connection arrangement configured to enable connection of the electrically conductive body to an aircraft electrical cable raceway in an electrically conductive manner.

In that way, the cable carried by the raceway is protected by means of the cable protector in any gap in raceway sections.

The cable protector is preferably a flexible, woven metallic mesh. In such a case, the electrically conductive body of the cable protector may be similar in cross-sectional shape to the cross-sectional shape of the electrical cable raceway to which it is intended to be connected. Alternatively, the body may be made of multiple pieces of woven metallic mesh, each piece defining a conduit through which an electrical cable can pass and having an electrically conductive connection arrangement configured to enable connection of that piece of the protector to the raceway in an electrically conductive manner. In that way, individual cables running through individual raceway channels can be protected in their own right and also protected one from the other. Alternatively, the electrically conductive connection may be formed by extending the cable protector into the channel of the electrical cable raceway. In an alternate design, the cable protector may be a single channel with such extensions, or multiple channels formed from a single piece, each channel having its own respective extensions. In this arrangement, a further electrically conductive connection arrangement may or may not be used.

Advantageously, the single piece-multiple channel design provides inter-cable protection, whilst only requiring a single electrical connection arrangement at either end. The material of the woven metallic mesh may be chosen to provide high energy, high temperature arcing protection between the cables, to prevent the cable of one channel damaging a cable of an adjacent channel.

In an alternative, less complicated design, the cable protector may comprise a flexible, woven metallic mesh material sleeve which has an electrically conductive connection arrangement at one end configured to enable connection to a raceway. Where the cable protector is intended to bridge the gap between two raceway sections, the cuff may be arranged to surround the respective ends of the raceway sections that are being bridged and the cuff in those arrangements would include an electrically conductive connection arrangement at each end thereof to enable connection in an electrically conductive manner of the protector to the raceway sections to be bridged.

The electrically conductive connection arrangement may comprise permanently bonding the electrically conductive body to a cable raceway, for example by means of welding or by means of an electrically conductive adhesive. Alternatively, the electrically conductive connection arrangement may comprise a removable connection to enable the cable protector to be removed from the electrical cable raceway, for example, for maintenance.

According to another aspect of the invention there is provided an aircraft electrical cable raceway assembly comprising a first electrical cable raceway section in the form of an elongate channel, a second electrical cable raceway section in the form of an elongate channel, first and second electrical cable raceway sections being spaced apart so as to define an electrical cable raceway section gap, an electrical cable protector arranged to bridge the gap between the first and second electrical cable raceway sections, the electrical cable protector being connected at or adjacent a first end thereof to the first electrical cable raceway section in an electrically conductive manner and being connected at or adjacent a second, opposite end thereof to the second electrical cable raceway section in an electrically conductive manner.

Figure 1:
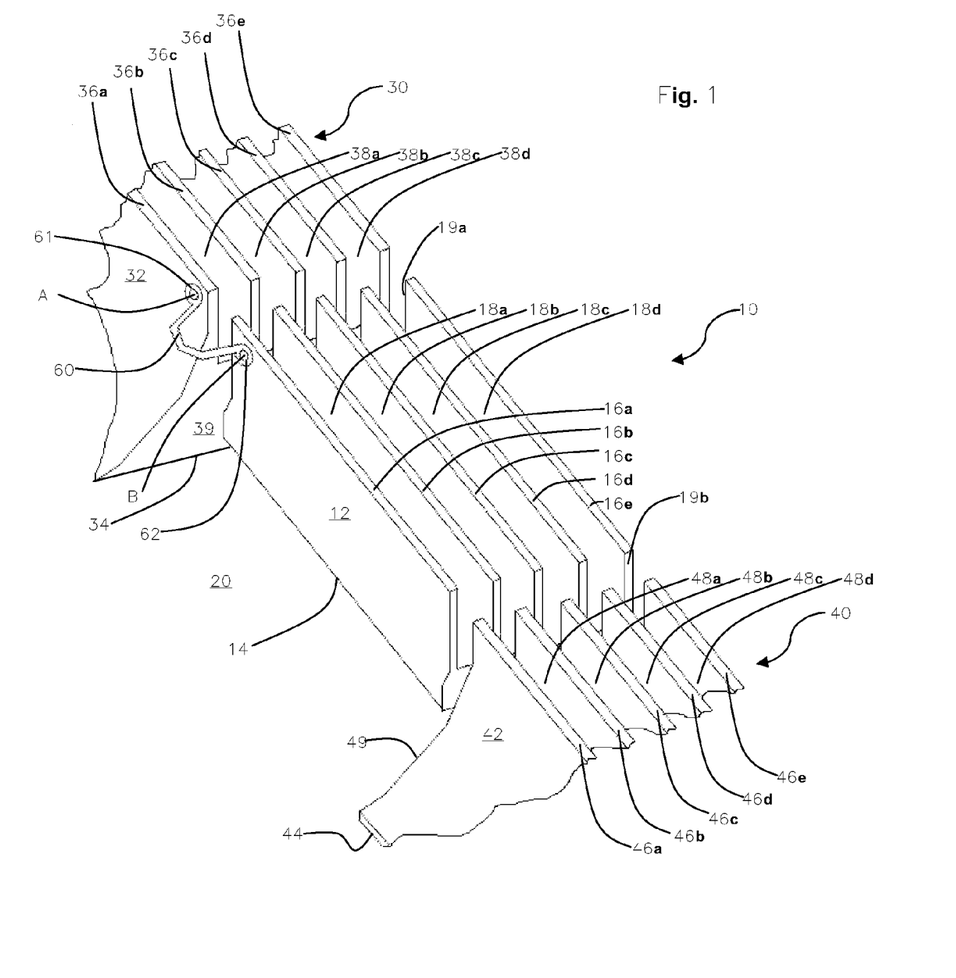
FIG. 1 shows a perspective view of the cable protector in accordance with a first embodiment of the present invention.

In FIG. 1, a first cable raceway 30 is spaced apart, end-to-end from a second cable raceway 40 to define a gap 20 therebetween. A cable protector 10 in accordance with the invention is arranged in the gap 20.

The cable raceways 30, 40 each comprise an elongate body 32, 42 having a base 34, 44 and five elongate, spaced-apart, parallel walls 36a-e, 46a-e. The base 34, 44 and walls 36a-e, 46a-e define, respectively, four U-shaped channels 38a-d, 48a-d. The body 32 of the first cable raceway has a first end (not shown in FIG. 1) and a second end 39. The body 42 of the second cable raceway 40 has a first end 49 and a second end (not shown in FIG. 1).

The cable protector 10 comprises an elongate body 12 with a base 14 and five elongate, spaced-apart, parallel walls 16a-e. The base 14 and walls 16a-e define four U-shaped channels 18*a-d*. The body 12 of the cable protector has a first end 19*a* and a second, opposite end 19*b*.

The first cable raceway 30 and second cable raceway 40 are arranged in a line such that there is a gap 20 between them, which is bounded by the second end 39 of the first cable raceway 30 and the first end 49 of the second cable raceway 40. The cable protector 10 is disposed within this gap and arranged so that its first end 19*a* is adjacent to the second end 39 of the first cable raceway 30 and its second end 19*b* is adjacent to the first end 49 of the second cable raceway 40 such that the cable channels 38*a-d*, 18*a-d*, 48*a-d*, of the first cable raceway 30, cable protector 10 and second cable raceway 40 are in a line.

An electrical connector, 60 comprises a strip of conductive material having a first end 61 and a second end 62. The electrical connector 60 is arranged in electrically conductive connection to the first cable raceway 30 by its first end 61, at a point A on the wall 36*a* adjacent the second end 39 of the raceway and to the cable protector 10 by its second end 62, at a point B, on the wall 16*a* adjacent the first end 19*a* of the protector 10. Another connector arrangement (not shown) is arranged in conductive connection with the second cable raceway 40 and the cable protector 10 in a similar manner.

Figure 2:
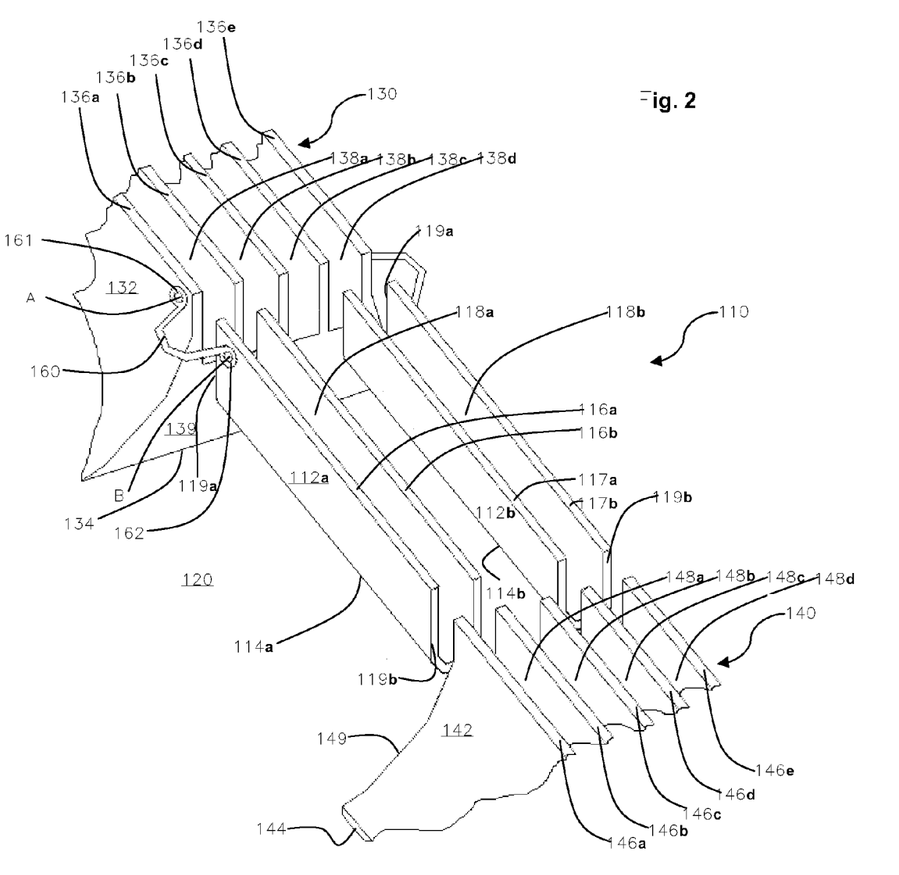
FIG. 2 shows a perspective view of the cable protector in accordance with a second embodiment of the present invention.

FIG. 2 shows a second embodiment in accordance with the present invention, which is substantially similar to that shown in FIG. 1. Similar features have been assigned the same numbers, prefixed by "1" to identify those features as comprising the second embodiment.

Cable raceways 130, 140 in FIG. 2 are identical to those in FIG. 1.

Unlike cable protector 10 in FIG. 1, cable protector 110 in FIG. 2 comprises two separate elongate bodies 112*a*, 112*b*. Each body 112*a*, 112*b* has an elongate base 114*a*, 114*b* and two elongate spaced apart, parallel walls 116*a, b*, 117*a, b*. The respective bases 114*a*, 114*b* and wall pairs 116*a, b*, 117*a, b* define two U-shaped channels 118*a, b*. The cable protector 110 has a first end 119*a* adjacent first cable protector 130 and a second end 119*b* adjacent second cable protector 140.

The first cable raceway 130 and second cable raceway are arranged in a line such that there is a gap 120 between them, which is bounded by the second end 139 of the first cable raceway 130 and the first end 149 of the second cable raceway 140. The cable protector 110 is disposed within this gap 120 and arranged so that the first end 119*a* is adjacent to the second end 139 of the first cable raceway 130 and the second ends 119*b* is adjacent to the first end 149 of the second cable raceway 140. The two U-shaped channels 118*a, b* provide conduits for cables running within cable channels 138*a*, 148*a*, 138*d*, 148*d*.

Electrical connectors 160 as described in relation to FIG. 1 are arranged to connect first cable raceway 130 to the cable protector bodies 112*a, b*. A further two electrical connectors (not shown) are arranged in conductive connection with the second cable raceway 140 and the cable protector bodies 112*a* and 112*b* in a similar manner.

Figure 3A:
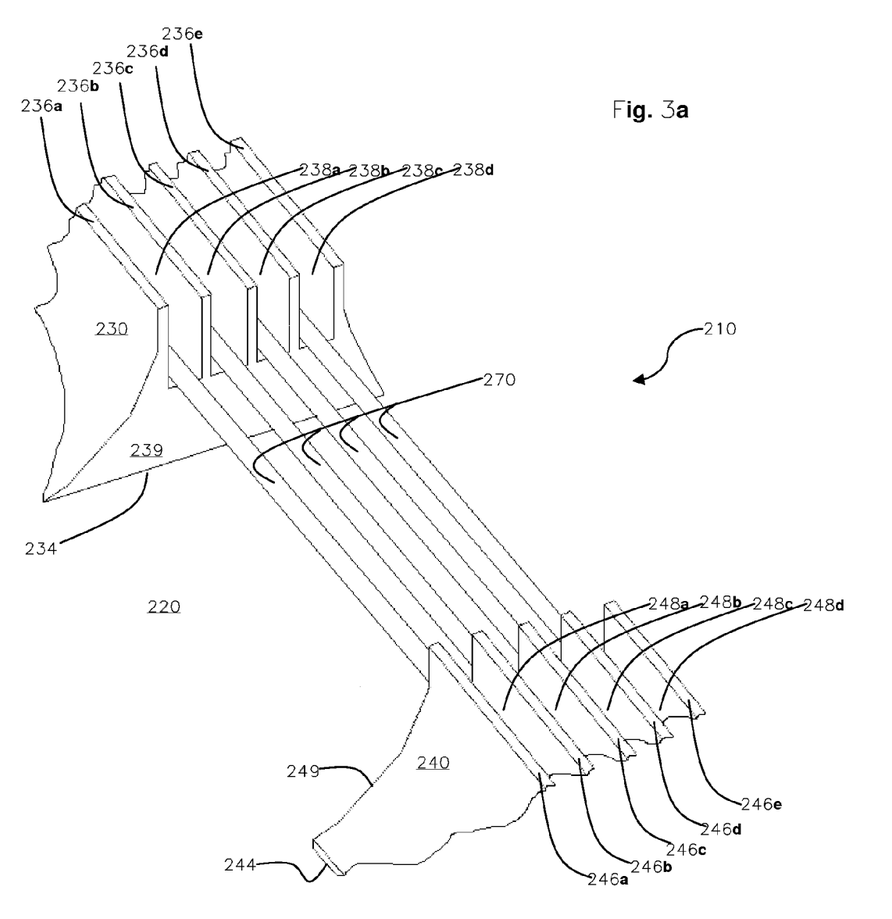
FIG. 3a shows a perspective view of a gap between two cable raceways.
Figure 3B:
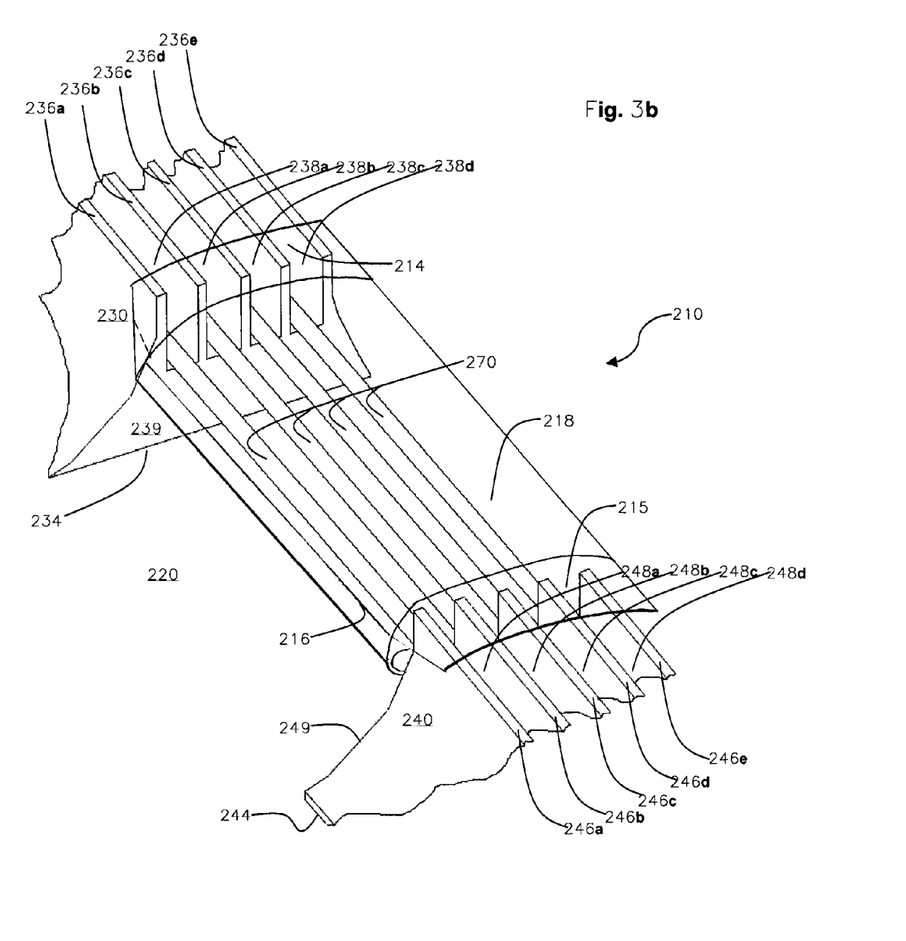
FIG. 3b shows a perspective view of a cable protector in accordance with a third embodiment of the present invention.

FIGS. 3*a* and 3*b* show a third embodiment of electrical cable protector in accordance with the present invention, which is substantially similar to that shown in FIG. 1. Similar features have been assigned the same numbers, prefixed by "2" to identify the features as comprising the third embodiment.

In FIG. 3*a*, the first and second cable raceways 230, 240 are as shown in FIGS. 1 and 2 with a gap 220 therebetween.

Four electrical cables 270 run between the cable channels 238*a-d*, 248*a-d* in the first cable raceway 230 and the second cable raceway 240.

FIG. 3*b* shows the arrangement of FIG. 3*a* with a closed sleeve cable protector 210 surrounding the cables 270 running across the gap 220. The cable protector 210 comprises a sleeve-like body 218 which surrounds the cables 270 and spans the gap 220. The body has an elongage slit 216 which can be opened to allow maintenance access to the cables or closed to provide all round EMH protection. The body 218 further comprises a cuff 214, 215 at each end, which cuffs act to connect the cable protector 210 to the raceways 230, 240. The electrical connection of the cuffs 214, 215 to the raceways 230, 240 may be by welding or by use of an electrically conductive adhesive. The sleeve-like body 218 is made from a metallic woven mesh to provide a flexible protector between raceways. Alternatively bonding tags may be used for electrical connection of the sleeve cable protector 210 to the raceways 230, 240.

Figure 4:
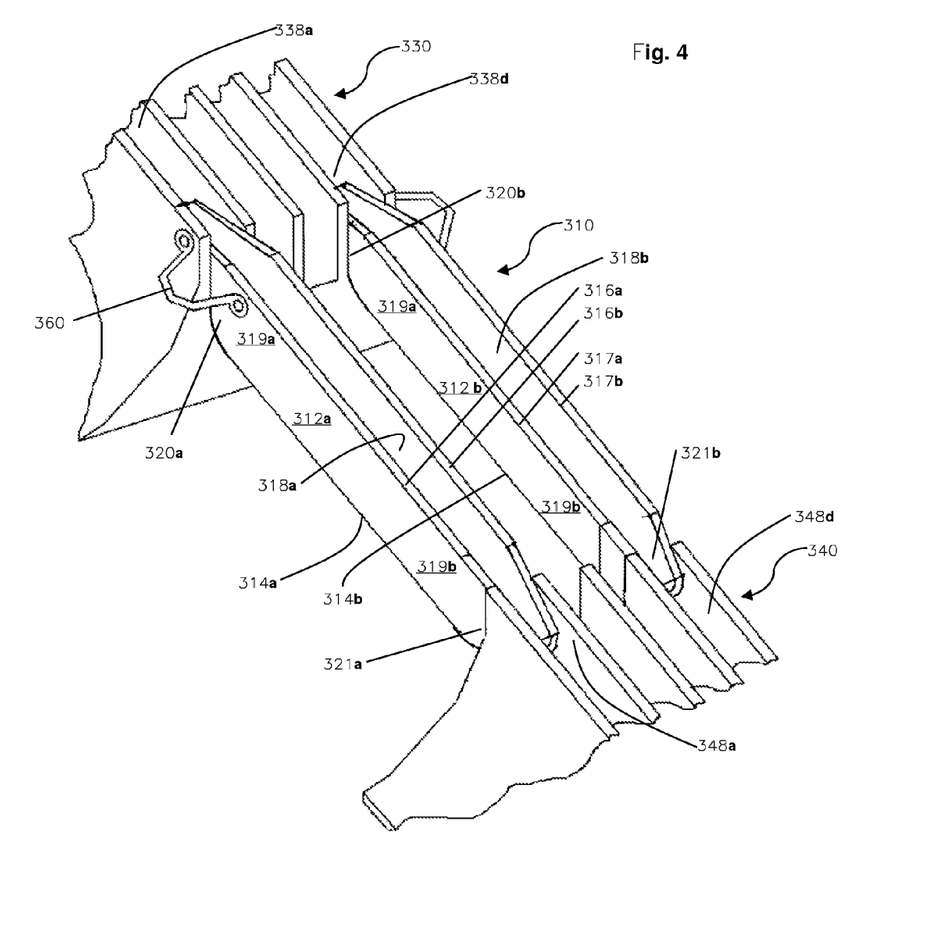
FIG. 4 shows a perspective view of the cable protector in accordance with a fourth embodiment of the present invention.

FIG. 4 shows a fourth embodiment in accordance with the present invention, which is substantially similar to that shown in FIG. 2. Similar features have been assigned the same numbers, prefixed by "3" to identify those features as comprising the fourth embodiment.

Like the cable protector of FIG. 2 the cable protector 310 of the fourth embodiment comprises two separate elongate bodies 312*a*, 312*b*. Each body 312*a*, 312*b* has an elongate base 314*a*, 314*b* and two elongate spaced apart, parallel walls 16*a, b*, 317*a, b*. The respective bases 314*a*, 314*b* and wall pairs 316*a, b*, 317*a, b* define two U-shaped channels 318*a, b*. The cable protector 310 elongate bodies 312*a, b* have first extension portions 320*a, b* at their first ends 319*a* and second extension portions 321*a, b* at their second ends 319*b*. The first extension portion 320*a* of the first elongate body 312*a* sits in the channel 338*a* of the first cable protector 330 and similarly the second extension portion 321*a* of the first elongate body 312*a* sits in the channel 348*a* of the second cable protector 340. The first extension portion 320*b* of the second elongate body 312*b* sits in the channel 338*d* of the first cable protector 330 and similarly the second extension portion 321*b* of the second elongate body 312*b* sits in the channel 348*d* of the second cable protector 340. A bonding tag 360 may or may not be used.

Figure 5:
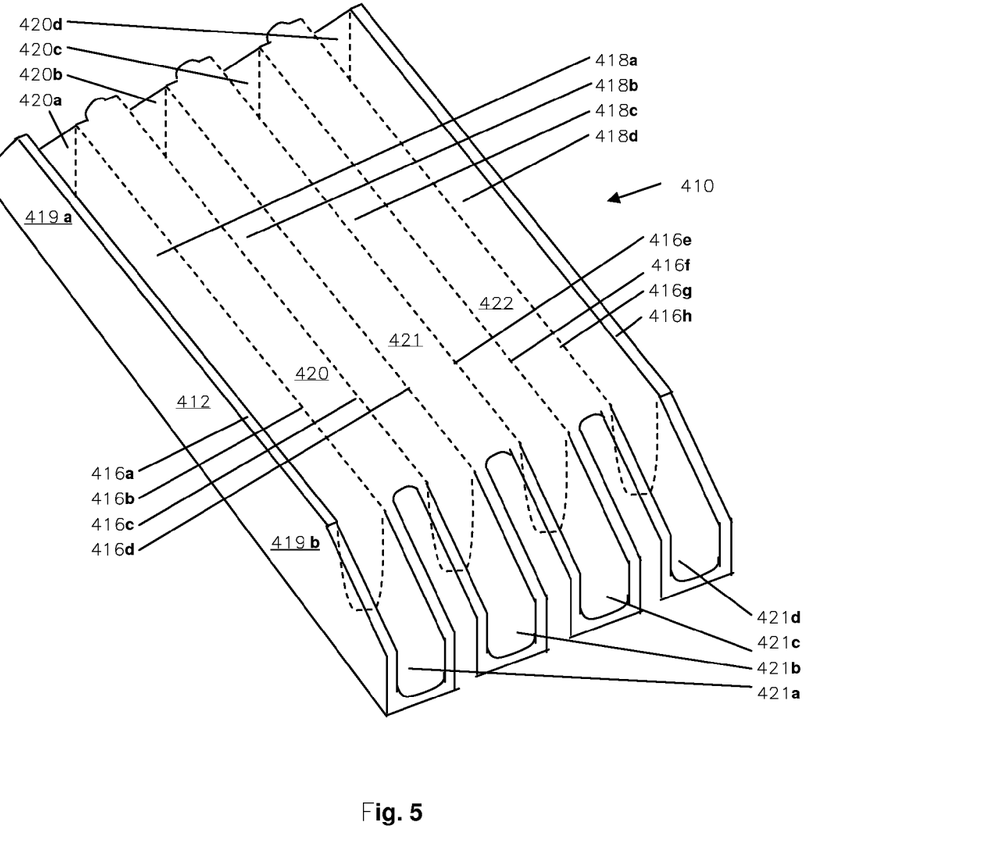
FIG. 5 shows a partial perspective view of the cable protector in accordance with a fifth embodiment of the present invention.

FIG. 5 shows a fifth embodiment in accordance with the present invention, which is substantially similar to that shown in FIG. 4. Similar features have been assigned the same numbers, prefixed by "4" to identify those features as comprising the fifth embodiment.

Like the cable protector of FIG. 1 the cable protector 410 of the fifth embodiment comprises a single elongate body 412 defining multiple U-shaped channels 418*a, b, c, d*, each channel including first extension portions 420*a, b, c, d* at the first end 419*a* of the single elongate body 412 and second extension portions 421*a, b, c, d* at the second end 419*b* of the single elongate body 412. The multiple U-shaped channels are formed together as a continuous body, whereby adjacent parallel walls are connected via connecting regions 420, 421, 422. That is the first channel, being formed by parallel walls 416*a*, 416*b* is joined to the second channel, being formed by parallel walls 416*c*, 416*d*, by connecting region 420 which is connected to walls 416*b* and 416*c*. The third channel, being formed by parallel walls 416*e*, 416*f* is joined to the second channel by connecting region 421 which is connected to walls 416*d* and 416*e*. The fourth channel, being formed by parallel walls 416*g*, 416*h* is joined to the third channel by connecting region 422 which is connected to walls 416*f* and 416*g*.

Although in the drawings, the first and second cable raceways are arranged in line and have the same number of cable channels, it is possible for the raceways to be arranged at an oblique angle relative to each other. Also, single or multiple, separate first raceways may be connected to single or multiple second raceways with one or more separate cable protectors according to the invention.

The invention claimed is:

1. A cable protector for connection to an aircraft electrical cable raceway and configured to be disposed adjacent a cable raceway, the protector comprising a flexible, electrically conductive body defining a conduit through which an electrical cable can pass and an electrically conductive connection arrangement electrically connected to the raceway to enable connection of the body of the protector to the raceway in an electrically conductive manner.

2. The cable protector of claim 1, made of a flexible mesh.

3. The cable protector of claim 2 in which the mesh is a metallic material mesh.

4. The cable protector of claim 1, in which the cable protector is connected to an electrical cable raceway and the electrically conductive body of the cable protector is similar in cross-sectional shape to the cross-sectional shape of the raceway.

5. The cable protector of claim 2, in which the body is made of multiple pieces of woven metallic mesh, each piece defining a conduit through which an electrical cable can pass and having an electrically conductive connection arrangement electrically connected to the raceway to enable connection of that piece of the protector to the raceway in an electrically conductive manner.

6. The cable protector of claim 2, in which the cable protector comprises a flexible, woven metallic mesh material sleeve which has an electrically conductive connection arrangement at one end configured to enable connection to a raceway.

7. The cable protector of claim 6, in which, where the cable protector is intended to bridge the gap between two raceway sections, the sleeve is arranged to surround the respective ends of the raceway sections that are being bridged and the sleeve includes an electrically conductive connection arrangement at each end thereof to enable connection in an electrically conductive manner of the protector to the raceway sections to be bridged.

8. The cable protector of claim 6, in which the sleeve has an elongate slit.

9. The cable protector of claim 1, in which the electrically conductive connection arrangement comprises bonding the body to the raceway permanently.

10. The cable protector of claim 9, in which the bonding is effected by welding.

11. The cable protector of claim 9, in which the bonding is effected by an electrically conductive adhesive.

12. The cable protector of claim 1 in which the connection arrangement is removable from the cable protector or removable from a raceway to which it is attached.

13. The cable protector of claim 1, resistant to operating temperature ranges of −50 deg C. to +50 deg C.

14. The cable protector of claim 1 wherein the cable protector extends for a portion such that the portion is seated in at least one channel of the cable raceway.

15. The cable protector of claim 14 wherein the cable protector is seated in each channel of the cable raceway.

* * * * *